US012511653B1

(12) United States Patent
Delong et al.

(10) Patent No.: US 12,511,653 B1
(45) Date of Patent: Dec. 30, 2025

(54) BUSINESS-TO-BUSINESS NETTING

(71) Applicant: United Services Automobile Association (USAA), San Antonio, TX (US)

(72) Inventors: Joseph Gregory Delong, San Antonio, TX (US); Steven James Schroeder, Oak Point, TX (US); Jonathan Huntington Rhea, North Richland Hills, TX (US); Alexander Benetto Nagelberg, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 160 days.

(21) Appl. No.: 17/567,600

(22) Filed: Jan. 3, 2022

Related U.S. Application Data

(63) Continuation of application No. 16/261,296, filed on Jan. 29, 2019, now Pat. No. 11,216,813.

(60) Provisional application No. 62/623,904, filed on Jan. 30, 2018.

(51) Int. Cl.
| | |
|---|---|
| *G06Q 20/40* | (2012.01) |
| *G06F 9/46* | (2006.01) |
| *G06Q 30/08* | (2012.01) |
| *G06Q 40/08* | (2012.01) |
| *H04L 12/14* | (2006.01) |
| *H04L 9/00* | (2022.01) |

(52) U.S. Cl.
CPC ............. *G06Q 20/401* (2013.01); *G06F 9/46* (2013.01); *G06Q 30/08* (2013.01); *G06Q 40/08* (2013.01); *H04L 12/1453* (2013.01); *G06Q 2220/00* (2013.01); *H04L 9/50* (2022.05)

(58) Field of Classification Search
CPC .. G06Q 20/401; G06Q 40/08; G06Q 2220/00; G06F 9/46; H04L 9/50
See application file for complete search history.

(56) References Cited

U.S. PATENT DOCUMENTS

| | | | | |
|---|---|---|---|---|
| 5,970,479 | A | * | 10/1999 | Shepherd ............... G06Q 40/02 705/37 |
| 6,076,074 | A | * | 6/2000 | Cotton ................. G06Q 20/102 705/40 |
| 10,963,966 | B1 | | 3/2021 | Brandmaier et al. |
| 11,100,477 | B1 | | 8/2021 | Kemper et al. |

(Continued)

FOREIGN PATENT DOCUMENTS

| | | | | |
|---|---|---|---|---|
| WO | WO-2004068293 A2 | * | 8/2004 | ........... G06Q 20/401 |
| WO | WO-2018127923 A1 | * | 7/2018 | ............. G06F 21/64 |

OTHER PUBLICATIONS

Blockchain—Wikipedia, Jun. 2017.*
Andreas Antonopoulos, "Mastering Bitcoin", Dec. 2014, O'Reilly Media, Inc.*

*Primary Examiner* — Steven S Kim
(74) *Attorney, Agent, or Firm* — Fletcher Yoder, P.C.

(57) ABSTRACT

Systems and methods for performing netting of business-to-business payments for settlement of running balances between parties are provided. To that end, blockchain infrastructures allow smart contracts that may be suitable for subrogation and netting operations, and the smart contracts that facilitate the operations. Application-programming interfaces (APIs) are provided that may be used to interact with the smart contracts.

14 Claims, 7 Drawing Sheets

(56) References Cited

U.S. PATENT DOCUMENTS

| | | | |
|---|---|---|---|
| 11,216,813 B1* | 1/2022 | Delong | H04M 15/00 |
| 2008/0071664 A1 | 3/2008 | Silverman et al. | |
| 2016/0292672 A1 | 10/2016 | Fay et al. | |
| 2017/0186057 A1 | 6/2017 | Metnick | |
| 2017/0308893 A1 | 10/2017 | Saraniecki | |
| 2018/0025442 A1 | 1/2018 | Isaacson et al. | |
| 2018/0091316 A1* | 3/2018 | Stradling | H04L 9/3297 |
| 2018/0176229 A1* | 6/2018 | Bathen | H04L 9/3239 |
| 2018/0300741 A1* | 10/2018 | Leonard | G06Q 30/08 |
| 2018/0365684 A1 | 12/2018 | Reilly et al. | |
| 2019/0026821 A1* | 1/2019 | Bathen | G06Q 40/00 |
| 2019/0102736 A1 | 4/2019 | Hudson | |

\* cited by examiner

BUSINESS-TO-BUSINESS NETTING

CROSS REFERENCE TO RELATED APPLICATIONS

This application is a continuation of U.S. Non-Provisional patent application Ser. No. 16/261,296, entitled "BUSINESS-TO-BUSINESS NETTING", which was filed on Jan. 29, 2019, and which claims priority to and the benefit of U.S. Provisional Patent Application Ser. No. 62/623,904, entitled "BUSINESS-TO-BUSINESS NETTING", which was filed on Jan. 30, 2018, the entireties of which are incorporated by reference into the present disclosure for all purposes.

BACKGROUND

The present disclosure relates generally to methods and systems to facilitate netting of business-to-business payments using shared smart contract infrastructures. Netting entails offsetting the value of multiple positions (e.g., debt claims, credit claims, swaps) and payments due to be exchanged between two or more parties. Netting may, for example, be applied to perform subrogation operations. Subrogation refers to payment collection from a party on behalf of another party to which a debt is owed. The term smart contract refers to a distributed program that may be stored in a blockchain that may be used to digitally facilitate, verify, and/or enforce the negotiation or performance of a contract, while ensuring that the smart contract transactions are trackable and irreversible.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Many organizations and enterprises offer risk management or similar services that allow customers to manage or reduce risk against uncertain loss. As an example, insurance companies may offer insurance products by which, in exchange of a regularly paid premium by a customer, the insurance company assumes liability and recovers damages incurred as a result from a loss to an insured good. The assumed liabilities often lead to creation of debt and credit claims, and origination of payments with the other parties. In many situations, the organizations may frequently have multiple debts and/or credit claims against each other, which may be originated in response to distinct, unrelated events. For example, two insurance companies that offer automotive insurance services in a particular region may be parties to several automotive accidents in which different customers were involved. As a result, the two insurance companies may have multiple debt and credit claims exchanged associated with the accidents. Subrogation payments, payments made to settle outstanding debt and credit claims, are often done in an event-by-event basis. The multi-party nature of such transactions may generate substantial accounting challenges.

SUMMARY

Embodiments of this disclosure include blockchain systems, application programming interfaces (APIs), smart contract data structures, and methods of operation thereof that may be used to implement and/or operate a subrogation system blockchain that is capable of performing subrogation payments and/or netting operations. The subrogation system blockchain embodiments may, at least, receive multiple debt and credit claims, generate swaps of the claims by matching, and obtain a balance for operations. The use of a blockchain infrastructure to implement a subrogation system may allow a publicly accessible, tamper-proof, resilient, and auditable platform for storage and tracking of the operations. The use of the smart contracts, such as the ones described herein, may further allow the subrogation system to perform several operations automatically, in a transparent manner. While the embodiments described herein are discussed in the context of subrogation payments, the systems and methods may be used to perform more general business-to-business payments.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
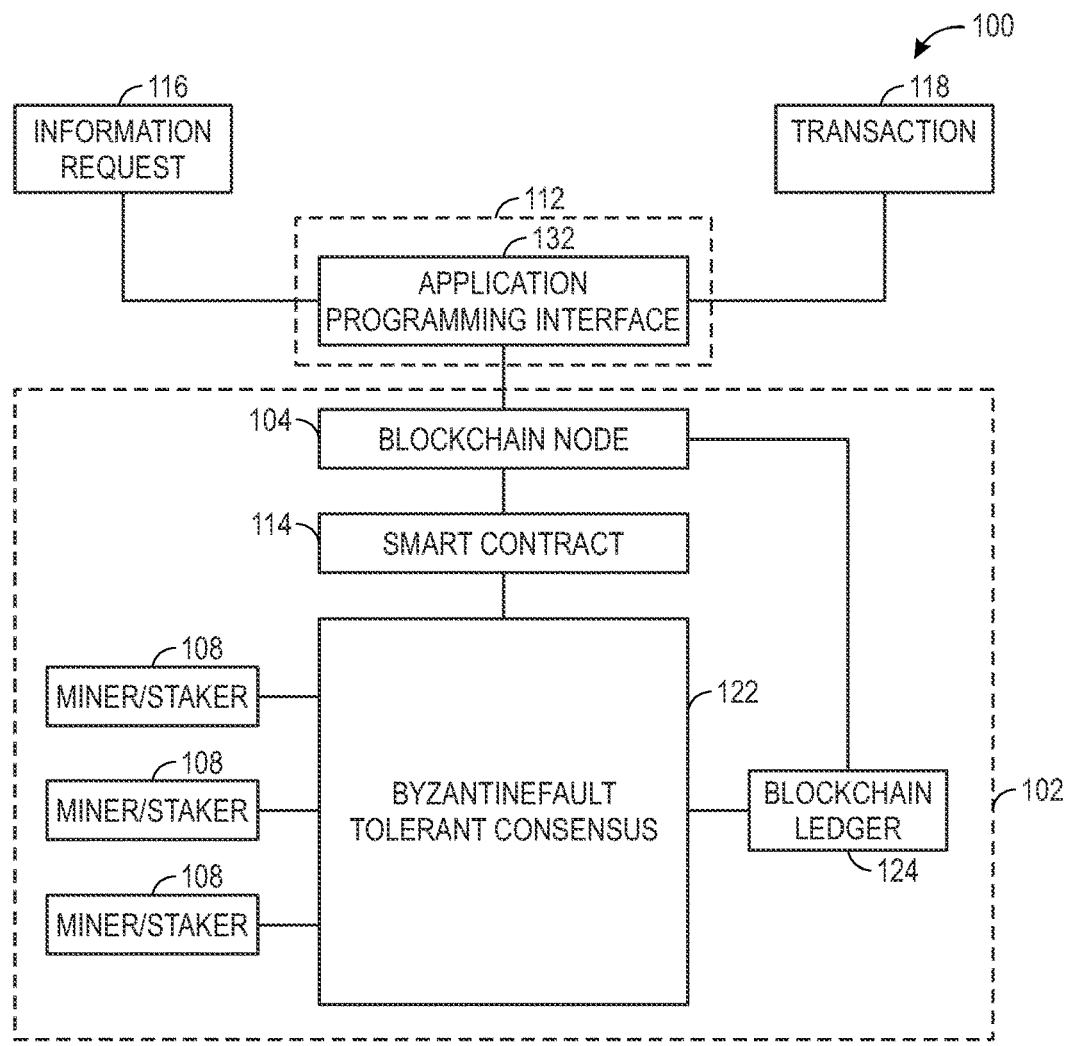
FIG. 1 is an illustration of a blockchain infrastructure that may be used to perform netting of business-to-business payments, in accordance with the embodiment.

One or more specific embodiments of the present disclosure are described above. In an effort to provide a concise description of these embodiments, certain features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In many situations, multiple parties of a particular market may have outstanding debt or credit claims against other parties. These debt and credit claims may be associated to distinct events. For example, in an automotive insurance market of a particular region, any two insurance companies of that market may be party to many unrelated car accidents. As a result, the two insurance companies may have multiple debt and credit claims between them, which need to be settled. The performance of the business-to-business payments may take place in an event-to-event basis, or the several claims may be aggregated and settled at once by performing netting of the outstanding payments.

Further complicating the accounting, each automotive accident may have non-insurance parties that may receive payments for damage recovery from one of the insurance companies. As a result, the settlement of all outstanding debts and claims between the two insurance companies, described hereinafter as "netting," may be complex, and the companies may settle each event on case-by-case basis. In such environment, the performance of subrogation payments, payments to settle outstanding debt and credit claims, may lead to substantial operational costs for the parties.

Present embodiments are generally directed toward methods and systems that employ a blockchain infrastructure to perform netting of subrogation payments. Blockchains are continuously growing lists of records (e.g., blocks), which are linked and secured using cryptography. By using a blockchain infrastructure that allows smart contracts, the methods and systems described herein allow a persistent, replicated, public, and automated database which may decrease substantially the operational costs associated with tracking events, debt and credit claims, and payments, and reducing the number of payments executed by reducing the cost and complexity of netting operations.

As discussed herein, smart contracts refer to distributed programs, or distributed applications that may be used to perform the transactions and recordation in the blockchain infrastructure. Smart contracts may include data structures that may keep track of the state of the smart contract, as well as smart contract functions to interact with the smart contract. As the interactions with the smart contracts may only take place through the smart contract functions (also described herein as member functions), the integrity of the state of the smart contract may be preserved.

As such, the present disclosure discusses methods and systems for deployment, maintenance, and interaction with the smart contracts. The current methods and systems may include, for example, application-programming interfaces (APIs), blockchain techniques including but not limited to the consensus mechanism and ledger replication mechanisms, as well as the terminal and servers that operate blockchain nodes and/or API nodes, as detailed herein. Technical advantages of the embodiments described herein also include the use of public blockchain to perform automated, trusted operations for netting and subrogation without costly, frequent auditing of the individual operations. The systems described herein allow the performed operations to be transparent, public, and tamper-proof, and thus may reduce the overall cost of operations and may, for some corporations, allow for low-cost netting operations.

With the foregoing in mind, FIG. 1 illustrates a system 100 that may be used to perform subrogation payments and netting operations, as discussed above. System 100 may include a blockchain network 102. The blockchain network 102 may be formed by several blockchain nodes, such as the example blockchain node 104. The blockchain node 104 may be implemented using a dedicated server or computer device, or may be implemented as virtual machine in a shared computer system, as understood in the art. Each blockchain node 104 may store and/or interact with the blockchain ledger 124. To that end, the blockchain node 104 may include a replicate of the blockchain ledger 124. Through blockchain node 104, the API 132 may interact with a smart contract 114. The API 132 may also interact with the smart contract 114 though use of an access node 112. As discussed herein, interaction with the smart contract 114 may include deployment, execution of information requests 116 and transactions 118. An information request 116 may refer to a request to retrieve the state of the smart contract 114. A transaction request 118 may refer to a request to change the state of the smart contract 114.

As discussed above, the smart contracts 114 may be in the blockchain ledger 124. The blockchain ledger 124 may be a replicated data structure. The consistency and integrity of the blockchain ledger 124 may be preserved by a consensus mechanism 122 performed by the miner/stalkers 108. In the blockchain infrastructure 102, a miner/stalkers may refer to a processing unit of the blockchain network 102 that may mine a blocks in the blockchain ledger 124, accept and/or replicate the mined blocks in the blockchain ledger 124, as understood in the art. Through the process of mining, miner/stalker 108 may create an update to the blockchain that persists the new state of the smart contract 114 to the blockchain ledger 124. Updates to the blockchain may occur in response to a transaction 118.

Examples of smart contracts 114 discussed herein include smart contracts related to debt and/or credit claims, smart contracts that perform netting and settlement operations, and smart contracts that may record information regarding parties and settlement methods associated to the parties of credit and/or debt claims. The operation and interaction between smart contracts 114 are further detailed below. Following deployment of the smart contract 114, the blockchain node may propagate its update of the blockchain ledger 124 and the other nodes of the network may accept the update using a consensus mechanism (e.g., proof of work, proof of stake, etc.). For example, if a miner/stalker 108 generates a block (e.g., a blockchain segment) that incorporates changes to the smart contract 114 to blockchain ledger 124, miner/stalker 108 may propagate, validate, and/or accept the updated blockchain ledger 124.

Similarly, a transaction request 118 may be received by any miner/stalker 108 of the blockchain node 104. The transaction request 118 may include calls to functions of the smart contract 114, to perform operations that cause a change to the state of a smart contract 114 recorded in the blockchain ledger 124. After performing the function of the smart contract 114, which may cause a changing to the state of the smart contract 114, in accordance with the transaction request 118, the miner/stalker 108 may update the blockchain ledger 124 to record the updated state of the smart contract 114. Changes to the blockchain ledger 124 may be validated and replicated by other miner/stalkers 108 through the consensus mechanism 122. An information request 116, similar to a transaction request 118, may be a call to a function of the smart contract 114. However, in contrast with the transaction request 118, the function of the smart contract 114 that is called by information request 116 does not lead to changes in the state of the smart contract 114, and thus, no update to the blockchain ledger 124 results from a successful information request 116.

Performance of the operations by the miners/stalker 108 of the nodes may be incentivized and/or regulated by exchange of tokens (e.g., currencies) of the blockchain. In public blockchains, updates to the blockchain ledger 124 by a blockchain node 104, from recording a smart contract 114 or from performing a transaction request 118 may be rewarded with a blockchain token. Moreover, performance of a transaction request 118 or an information request 116 may be rewarded with a blockchain token. For example, in the Ethereum public blockchain, updates to the blockchain from recordation of smart contracts 114 and information requests 116 may be rewarded with Ether tokens, and performance of transaction requests 118 and information requests 116 may be incentivized by offers of Ether in the form of Gas. The Gas mechanism may be used to implement prioritization mechanisms for the operations and/or to prevent large or faulty operations from blocking the blockchain with arbitrarily long operation times.

Figure 2:
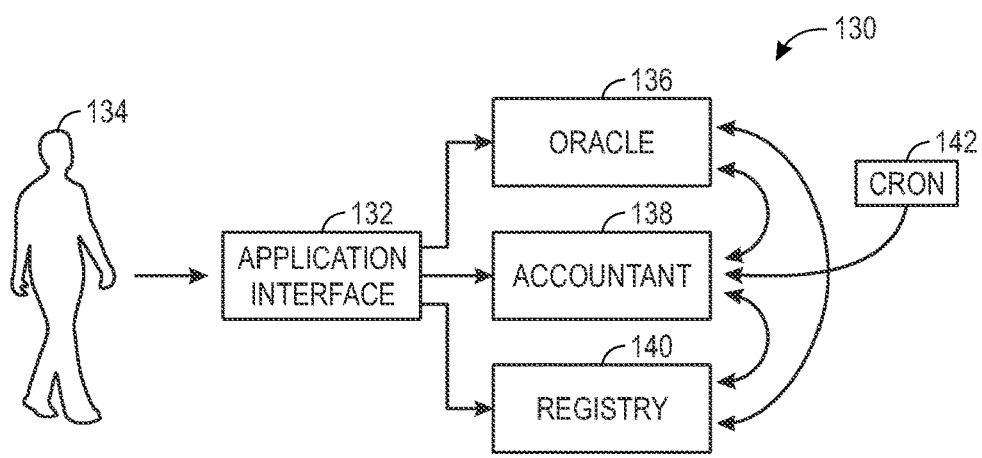
FIG. 2 is an illustration of systems that may be used to perform netting of business-to-business payments using smart contracts stored in the blockchain infrastructure, in accordance with an embodiment.

The infrastructure described above in system 100 FIG. 1 may be accessed by a subrogation system application programming interface 132 (API), illustrated in diagram 130 of FIG. 2. The subrogation system API 132 may provide an interface for operations that provides to users 134 access the blockchain network 102. To that end, the subrogation system API 132 may provide tools for creation and interaction with Oracle smart contracts 136, Accountant smart contracts 138, and Registry smart contracts 140. Oracle smart contracts 136 are smart contracts that may be used to track and match swap components from outstanding subrogation claims. Accountant smart contracts 138 may be used to keep a running balance of matched swaps and/or to perform payments in accordance with the swaps. Registry smart contracts 140 may be used to provide methods to identify users and to retrieve settlement information for the contracts. The subrogation API 132 may also be used to produce Cron smart contracts 142 (also called herein Crontract), timer contracts that may interact with the Accountant smart contract 138, or any other smart contract, periodically. The group of Oracle smart contracts 136, Accountant smart contracts 138, Registry smart contracts 140, and Cron smart contracts 142 that are recorded in the blockchain ledger 124 may be referred to herein as the subrogation system blockchain. The subrogation system blockchain may be stored in a dedicated blockchain network (e.g., that stores only contracts associated with the subrogation system blockchain) or a shared blockchain network. Moreover, as discussed above, the blockchain network may be public or private.

Furthermore, the users may access the smart contracts of the subrogation system blockchain using customized subrogation system APIs 132 that obey the interaction protocols of the smart contracts. Customization of the APIs 132 may allow integration between the subrogation system blockchain and other internal applications of the organization that is a party to the subrogation system blockchain. Such flexibility is a product of the smart contracts structure detailed below, in which the only allowed changes in the state of the contract are performed using instructions stored in the smart contract.

Figure 3A:
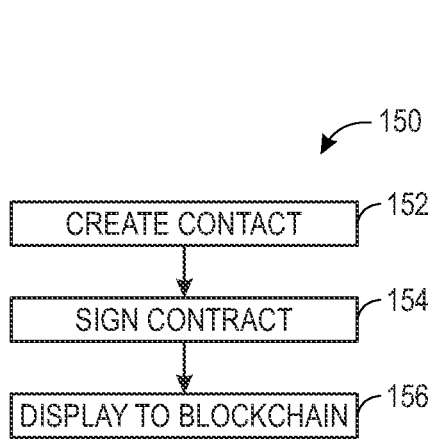
FIG. 3A is a method to deploy a smart contract in a blockchain, in accordance with an embodiment.
Figure 3B:
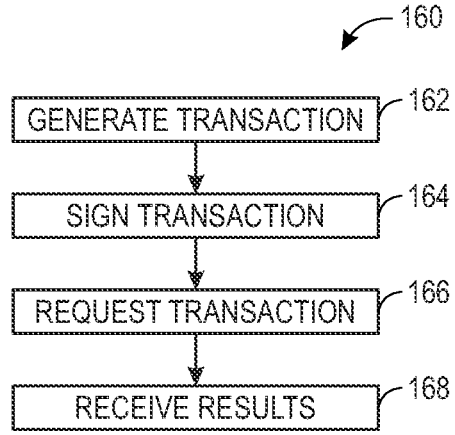
FIG. 3B is a method to interact with a smart contract, in accordance with an embodiment.

FIGS. 3A and 3B illustrate methods for operation of an API 132 to generate and interact with smart contracts. Method 150 for deployment of contracts, illustrated in FIG. 3A, is an example of a process performed by API 132 to generate a contract for the subrogation system blockchain. In a box 152, a smart contract may be created. The smart contract may be any of the subrogation system blockchain contracts, such as the Oracle contract 136, the Accountant contract 138, the Registry contract 140, and the Cron contract 142. The creation of the smart contract may specify initial values for the state of the smart contract, as detailed below. Moreover, the creation of the smart contract may include definitions of member functions for the smart contract, as detailed below. Details of the state and of the member functions of the smart contracts are provided below.

The API 132 may, in box 154, sign the smart contract. The signature of the smart contract may include encryption methods using public/private key infrastructure. For example, a user 134 may have a private key to sign the smart contract, which provides proof that the contract was originated by the user 134. In box 156, the signed contract may be provided to the blockchain network 102 for recordation, as discussed above. Box 156 may include processes which may convert the state and the functions of the smart contract to binary code for storage and execution by miners/stalkers 108 of the blockchain network 102. The signature in the smart contract may be used by parties to certify that they are interacting with the correct smart contract.

Method 160 for performance of transactions and information requests, illustrated in FIG. 3B, is an example of a process performed by API 132 to create Transaction and Information requests. In box 162, the user 134 may use API 132 to generate a request to a smart contract 114. The user may specify a type of smart contract, and the API 132 may provide a list of member functions of that smart contract. The user 134 may, then, chose the member function, and provide inputs associated with the member function. For example, a user 134 may request from an interaction with an Accountant smart contract 138. The API 132 may inform the user 134 that the Accountant smart contract 138 may have, among other member functions, an operation to perform on-chain payments based on the present balance, and the user may choose execution of that operation. Details of the state and of the member functions of the smart contracts are provided below.

The API 132 may, in box 164, add a digital signature to certain transaction requests 118 and information requests 116. The digital signature may be used in transactions that may benefit from validation of the origination. For example, in transactions associated with the recordation of a swap component, the signature may be used to validate that an alleged issuer of a transaction is, indeed, the actual issuer of the transaction. Digital signatures in Transaction and Information requests may use the same above-discussed public/private key infrastructure used for creation of smart contracts. The API 132 may also, for certain blockchain networks, allow an option for the amount of "gas" that a user is willing to use to incentivize performance of the operation.

The API 132 may, in box 166, request performance of the transaction 118 on the smart contract 114. The API 132 may receive from the results of the transaction 118, in the box 168 which may include an output of the member function, an acknowledgment of execution and/or an indication of failure if the transaction led to an error or if the amount of "gas" was insufficient to finalize the operation. It should be understood that the API 132 may provide an interactive user interface that may be accessed by a human user or an executable library. The executable library facilitates access to the subrogation system blockchain by other applications in the user computation environment. As an example, API 132 may be accessed by an accounting system of an organization, to, for example, coordinate the subrogation payments with other financial operations within the organization. In this example, the accounting system may use API 132 to perform the processes in methods 150 and 160 without direct human intervention.

In the illustrated embodiment, the subrogation system blockchain may have one Oracle smart contract 136, one Accountant smart contract 138, and one Registry contract 140. The Oracle smart contract 136, in this example, may have multiple entries and each entry may have a data structure as the one illustrated in diagram 200 in FIG. 4. The Accountant smart contract 138 may also have multiple entries, and each entry may have a data structure as the one illustrated in diagram 250. Alternative implementations of the subrogation system blockchain employ multiple oracle smart contracts 136, in which each entry is in itself an individual smart contract. Similarly, the subrogation system blockchain may employ multiple Accountant smart contracts 138, in which each entry is in itself an individual smart contract. A single smart contract system with multiple entries may facilitate operations such as search for specific entries, as the searches are contained in a single smart contract, but may result in large contracts that lead to higher costs of transaction (e.g., "gas" costs). By contrast, a system with multiple smart contracts may reduce the amount of the costs per transaction due to the reduced size of the contracts, but may require an overhead for finding and addressing the several contracts. The data structures herein may be adapted for use in a multi-contract system.

Figure 4:
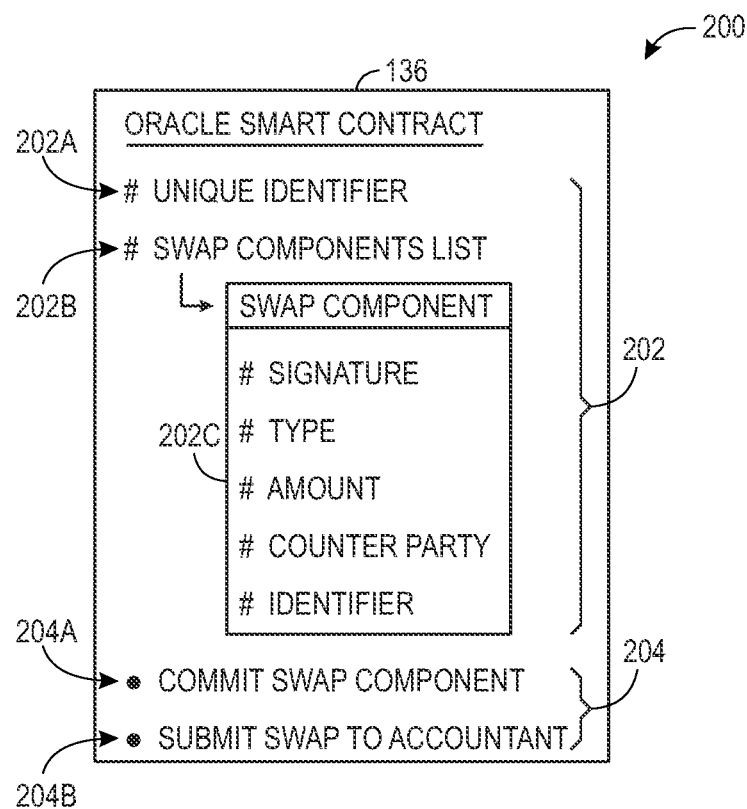
FIG. 4 is a logical diagram of an example of an Oracle smart contract, that may be used for tracking outstanding swap requests, in accordance with an embodiment.

The diagram 200 of FIG. 4 illustrates the data structure of an entry in an Oracle smart contract 136. The Oracle smart contract 136 may be a smart contract that is used to store credit claims and debt claims associated with a particular event that may require subrogation payments. The credit claims and debt claims may be stored in the Oracle smart contract 136 as swap components. A swap component may be issued as creditor swap component, in which a creditor may create a signed request indicating a demand for payment. The swap request may also be a debtor swap component, in which a debtor may create a signed request indicating an acceptance of a debt. Two swap components, a debt request and a credit request, may be matched when the debtor party accepts the debt requested by the creditor party, and a swap may be generated. In the example of a car insurance system, for example, the Oracle smart contract 136 may have multiple entries, each entry associated with an accident. Oracle smart contract 136 may have entries with state 202 and member functions 204. In the example, the state 202 may include a unique identifier 202A associated with the entry event and a list of swap requests (e.g., swap claims), or a swap component list 202B. Each swap component 202C of the swap component list 202B may have information associated with a particular swap component (i.e., the swap request). This information may include a signature from the party that issued the swap component, the type of swap component (e.g., credit or debit), the amount of the swap component, the counterparty for that swap component claim and an identifier for the swap component.

The Oracle smart contract 136 may also include member functions for adding a swap component to the Oracle smart contract 136 (function 204A) and for settling the Oracle smart contract 136 by submitting the balance of the swap components to an Accountant smart contract 138 (function 204B). The Accountant smart contract 138 may receive the balance of swap components as a swap entry. It should be noted that the swap components, generally, are matched for the Accountant smart contract 138 to accept the swap and enter it to the running balance. In some embodiments, the API 132 may verify the existence of an entry in an Oracle smart contract 136 using an event identifier prior to creation of the smart contract. If no such smart entry exists, the Oracle smart contract 136 creates the entry using the event identifier as the unique identifier 202A and the initial swap component information to create the first swap component 202C of the swap component list 202B. If the entry exists, the Oracle smart contract 136 may generate a request for transaction that employs function 204A to create a swap component 202C and add it to the swap component list 202B. It should be noted that the diagram 200 provides a non-limiting example of a data structure that implements an entry for an Oracle smart contract 136, and that variations of the specific data structure that provides similar functionality are also envisioned by the present disclosure.

Figure 5:
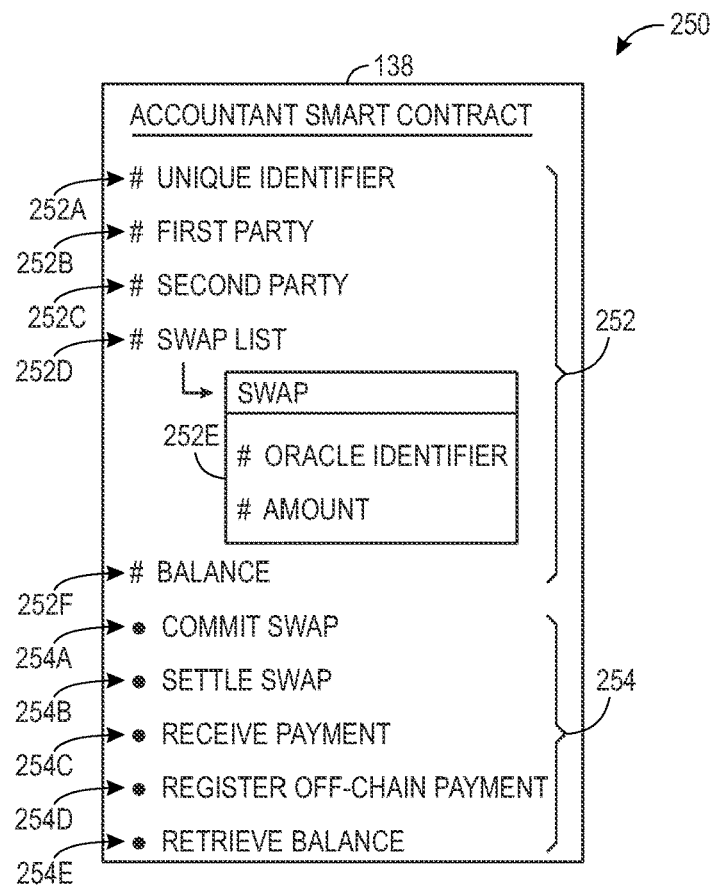
FIG. 5 is a logical diagram of an example of an Accountant smart contract, that may be used for netting swap requests and performing subrogation payments, in accordance with an embodiment.

The diagram 250 of FIG. 5 illustrates the data structure of an entry in an Accountant smart contract 138. The Accountant smart contract 138 may be a smart contract that is used to perform netting operations between two parties that are users of the subrogation system blockchain. To that end, the Accountant smart contract 138 may keep entries in which each entry maintains a balance of the total of credits and debts, a record of the settled swaps, and a record of "on-chain" payments (i.e., payments executed using blockchain tokens) and "off-chain" payments (i.e., payments executed using financial operations unrelated to the blockchain). In the example of a car insurance system, for example, an entry in the Accountant smart contract 138 may be associated with two companies that provide coverage in a specific region. The entry in the Accountant smart contract 138 may have a state 252 and member functions 254. In the example, the state 252 may include a unique identifier 252A that may be a used as a key. The state 252 may further include references 252B and 252C, which may be addresses to the two parties associated with the entry of the Accountant smart contract. The addresses may be made with reference to the Registry smart contract 140, detailed below. The state 252 may also include a list of settled swaps 252D. Each settled swap 252E may include an Oracle identifier, which references the settled entry in the Oracle smart contract 136 that originated the settled swap 252E. The settled swap 252E may also include an amount for the settlement, which may be used by the Accountant smart contract to perform netting operations. The state 252 may also include a balance 252F, which may store any outstanding balance following a netting operation and waiting for a subrogation payment. The balance 252F may be a running balance of all settled swaps 252E.

The Accountant smart contract 138 may also include member functions 254 for adding a swap from an Oracle smart contract 136 (function 254A) and/or settling a swap (function 254B). In some embodiments functions 254A and 254B may be performed atomically (i.e., performed in a single transaction). Function 254A may be used to update the settled swap list 252D, and function 254B may be used to update balance 254F based on the settled swaps 252E in the settled swap list 252D. The Accountant smart contract 138 member functions 254 may also include function 254C to enter a payment "on-chain" and/or function 254D to enter a payment "off-chain." The performance of functions 254C or 254D may lead to changes in the balance 252F associated with the entry. Accountant smart contract 138 may also include a member function 254 for retrieving the balance value 254E for an entry. It should be noted that the diagram 250 provides a non-limiting example of a data structure that implements by an Accountant smart contract 138, and that variations of the specific data structure that provides similar functionality are also envisioned by the present disclosure.

Figure 6:
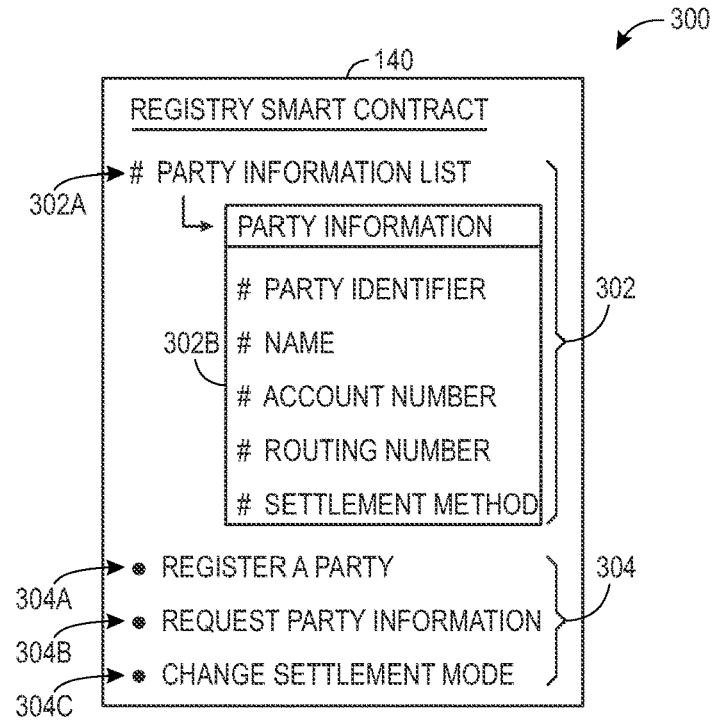
FIG. 6 is a logical diagram that exemplifies a Registry smart contract for registering parties and settlement methods, in accordance with an embodiment.

The diagram 300 of FIG. 6 illustrates the data structure of the Registry smart contract 140. The Registry smart contract 140 may be a smart contract that is used to store information of the parties that are members of a subrogation system blockchain, and payment and settlement information. In the example of a car insurance system, for example, the Registry smart contract 140 may have information of all insurance companies that are parties of the subrogation system blockchain. In some embodiments of the subrogation system blockchain, in which third parties may be members (e.g., in the automotive insurance system, hospitals, automotive repair shops, banks may be third parties that interact with the smart contracts), the Registry smart contract 140 may also be used to store and provide the third party information. Registry smart contract 140 may have a state 302 and member functions 304. In the example, the state 302 may include a list 302A of parties and their information. Each party information element 302B of the party information list 302A may have information for the party, such as a unique party identifier, a name, an accounting number, a routing number, and a type of preferred settlement method. The Registry smart contract 140 may also include member functions 304 such as function 304A for adding a new party to the registry smart contract 140, function 304B for retrieving information for a registered party, and/or function 304C to change party information with respect to settlement method, routing number, and/or account number. It should be noted that the diagram 300 provides a non-limiting example of a data structure that implements a Registry smart contract 140, and that variations of the specific data structure that provides similar functionality are also envisioned by the present disclosure.

Figure 7:
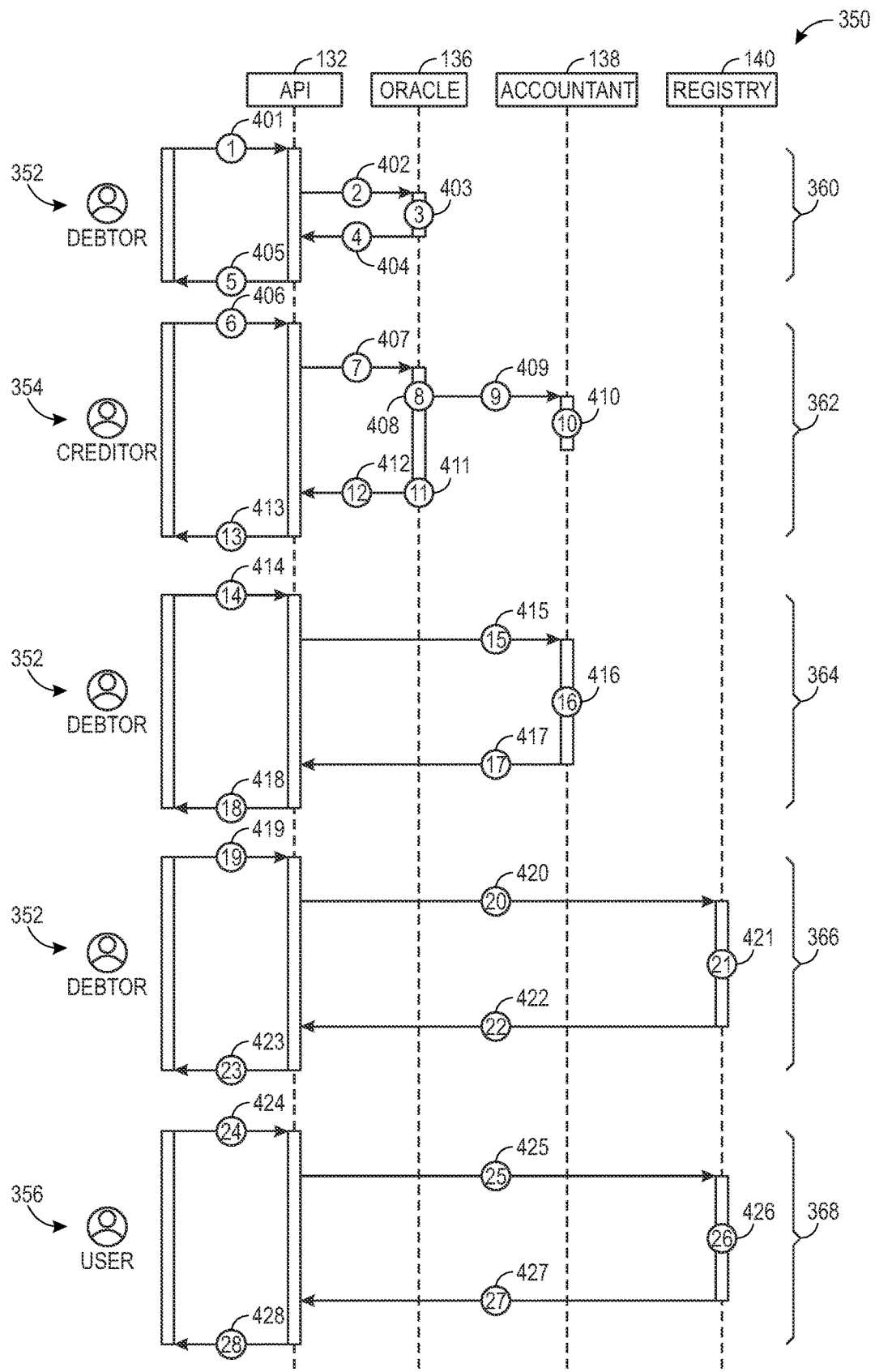
FIG. 7 is a use case diagram that illustrates an example of interaction between multiple parties and the blockchain infrastructure using the Oracle, the Accountant and the Registry smart contracts to perform subrogation payments, in accordance with an embodiment.

The sequence diagram 350 of FIG. 7 illustrates a process by which users, such as debtor 352, creditor 354, and user 356 (e.g., the debtor 352, the creditor 354, or a third party), may interact with the Oracle smart contract 136 to create swap requests, the Accountant smart contract 138 to settle claims and perform subrogation payments, and a Registry smart contract 140 to retrieve party data. The processes described in this sequence diagram 350 may be performed by using the smart contract structures described herein. In an operation 360, debtor 352 may report a swap. In process 401, the debtor 352 submits a swap component to the API 132 containing a signature, amount, counterparty address, and Swap ID (e.g., swap identifier), which may be associated with the event. In process 402, the API 132 the API submits a new swap component entry to the Oracle smart contract 136 using the information of the swap component for initialization. In process 403, the Oracle smart contract 136 may validate the swap component and seek for a matching swap component submitted, which in this scenario returns "false." Validation of the swap component may, among other things, include processes to verify that the signature received in the call from API 132 is valid and belongs to the debtor 352. The swap component may be saved to the storage for the Oracle smart contract 136. In process 404, the smart contract returns a response to the API 132 informing that the submitted swap component has been stored. In process 405, the API 132 passes the response back to the debtor.

The creditor 354 may report a swap related to the same event in operation 362. In process 406, the creditor 354 submits the swap component with a Swap ID that matches the Swap ID submitted by the debtor 352 to the API 132. The submitted swap component may also include, for example, a signature, amount, and the counterparty address. In process 407, the API 132 submits the swap component to the Oracle smart contract 136. The Oracle smart contract 136, in process 408, validates the submitted swap component (i.e. verify if the signature in the swap component is valid and belongs to creditor 354) and checks if a matching swap component was submitted, which in this scenario returns "true." After validation, in process 409, the Oracle smart contract 136 makes a call out to the Accountant smart contract 138 with the signature, amount, debtor 352 address, and creditor 354 address and Swap ID. In process 410, the Accountant smart contract 138 checks to see if an entry exists for the debtor 352 and creditor 354 in the contract storage. If there is no entry for that debtor 352 and creditor 354, a new entry is created. If the entry exists, the balance of the Accountant smart contract 138 may be updated to reflect the new amount. In process 411, the Oracle smart contract 136 may remove the associated swap component from the swap components list in the contract storage. In process 412, the Oracle smart contract 136 returns a response to the API 132 swap component has been properly stored in the subrogation system blockchain. In process 413, the API passes the response back to the creditor 354.

In operation 364, the debtor 352 may retrieve the settlement amount. The debtor 352 makes a call to the API 132 in process 414. In process 415, the API 132 makes a call to the Accountant smart contract 138 using the address of the debtor 352. In process 416, the Accountant smart contract 138 seeks the balance information using the address of the debtor 352 as the index. In process 417, the list of debts sorted by address the debtor 352 is returned to the API 132. The API 132 passes that list to the debtor 352 in process 418.

In operation 366, the debtor 352 may retrieve the settlement method for the creditor 354. In process 419, the debtor 352 makes a call to the API 132 with the unique identifier of the creditor 354. The call may also employ the name of the creditor 354. In process 420, the API 132 provides the address of the creditor 354 to the Registry smart contract 140. In process 421, the Registry smart contract 140 locates the information of the creditor 354 (e.g., party information) where the unique party identifier or the name may be used as a search key. Party information may be the account number, the routing number, and the name, as discussed above. Party information is not limited to these attributes but could be any method of settlement. In process 422, the Registry smart contract 140 returns the information of the creditor 354 to the API 132. In process 423, the API 132 passes the information of the creditor 354 to the debtor 352.

In operation 368, a user 356 may modify their registered party information. The user 356 may be a debtor 352, a creditor 354, and/or a third party. The user 356 submits their party information to the API 132, in process 424. Party information may be, but is not limited to, account number, routing number, and name of the user 356. In process 425, the API 132 submits the party information to the Registry smart contract 140. The Registry smart contract 140 parses the received party information and stores it in the contract, in process 426. The Registry smart contract 140 returns an acknowledgment of storage to the API 132, in process 427.

The API 132 provides to the user 356 a notification that the party information was successfully registered in the Registry smart contract 140, in process 428. The use cases examples described in FIG. 7 should be understood as a non-limiting example of interactions between parties and the subrogation system blockchain through the API 132.

Figure 8:
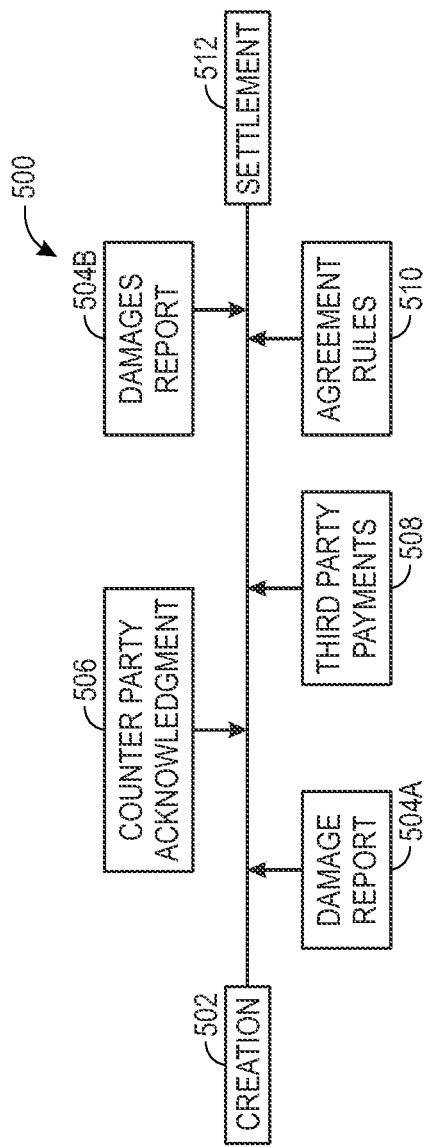
FIG. 8 is a time diagram for an Oracle smart contract, such as the one of FIG. 4, in accordance with an embodiment.

The above-described infrastructure for the subrogation system blockchain may be used to perform complex operations, including third party payments and agreements at later stages. An example of a lifetime diagram 500 for an entry of an Oracle smart contract 136 is illustrated in FIG. 8. In a box 502, the entry in the Oracle smart contract 136 may be created, as discussed above. The entry may be created with the initial swap request (which may be a debtor or a creditor swap request). In this example, the entry in the Oracle smart contract 136 may be continuously open to receive damages reports 504 at any time. Damage reports 504 may, for example, include a claim value and beneficiary (e.g., creditor or debtor), and may be entered in the claim swap. As an example, following an accident covered by an automotive policy, a first damage report 504A may be filed to report a payment to an auto-repair shop, which was made shortly after the accident. At a later point, a second damage report 504B may be filed to report a payment to a hospital that covers a treatment to an injured party, which was made much later after the accident.

As discussed above, the Oracle smart contract 136 may receive a matching claim 506 from a counterparty to indicate acknowledgement. The Oracle smart contract 136 may also receive third party payment information 508. All received information may be matched and entered to the state of the corresponding entry of the Oracle smart contract 136. In the automotive accident example, the third party payment information may be related to payments or payment agreements from a residential insurance policy that may cover a portion of the total damages as a matter of policy. Third party payment information 508 may be cause adjustments to the final outstanding balances. In certain embodiments, the Oracle smart contract 136 may allow for further adjustments based on negotiated and agreed rules 510 for payment divisions. In the illustration, the negotiations that result in the agreed rules 510 were entered at a time much after the creation of the Oracle smart contract 136, while the Oracle smart contract 136 was receiving all the swap requests. This allows for continuous accounting even while the two parties in the swap are negotiating rules associated to the payments associated with damage recovery. As an example of agreed rules 510, the parties may negotiate and agree that the creditor shall be responsible for 60% of the outstanding swap, or that both parties shall be equally responsible for the outstanding swap. Agreed rules 510 may set terms also related to financial instruments, such as currency used, exchange rate used, financial indexes and/or interest rates, fees for late payments, etc. As a result, the Oracle smart contract 136 reduces waiting times associated with the settlement of the swaps by allowing continuous accounting and storage of information before and/or during to the agreement on the rules.

The end of the lifetime of an entry in the Oracle smart contract 136 may take place by triggering a settlement operation 512. As discussed above, the settlement operation may take place once the total balances of the swap requests are even, or by external triggering. During the settlement operation, the balance of the matched swap components may be transmitted to the corresponding accountant smart contract 138 via a member function call. Following the settlement operation 512, the Oracle smart contract 136 may not receive any further information for the matched swap components this entry, and the data related to the particular entry may be eliminated to reduce resource usage (e.g., after an allotted amount of time after settlement, creation, or other milestones). Note that outstanding (i.e., non-matched) swap components may be preserved by the Oracle smart contract 136.

Figure 9:
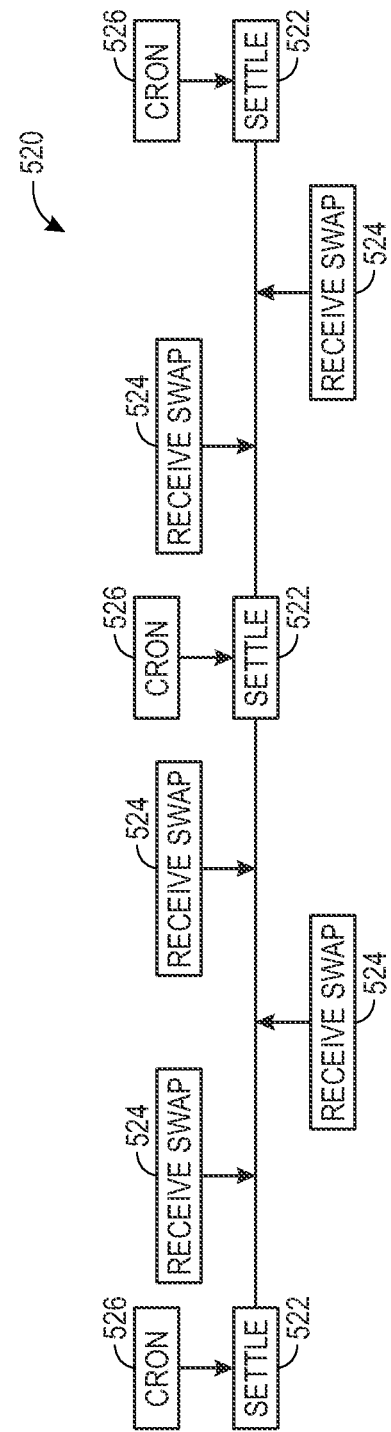
FIG. 9 is a time diagram for an Accountant smart contract, such as the one of FIG. 5, in accordance with an embodiment.

The above-described subrogation payment system may also be used to provide periodic settlement operations using the Accountant smart contract 138. An example of a lifetime diagram 520 for an Accountant smart contract 138 is illustrated in FIG. 9. The Accountant smart contract 138 may perform settlement operations 522, which may be used to update the outstanding balance of the received swaps 524. As noted above, the Accountant smart contract 138 may regularly receive settled swaps 524. The settlement operations 522 may be regularly performed by the blockchain using a Cron smart contract 142 that performs periodic triggering 526. The Cron smart contract structure 142 is detailed below. The periodic triggering of the settlement operations 522 may also be performed by regular calls scheduled from the API 132, originated "off-chain."

Figure 10:
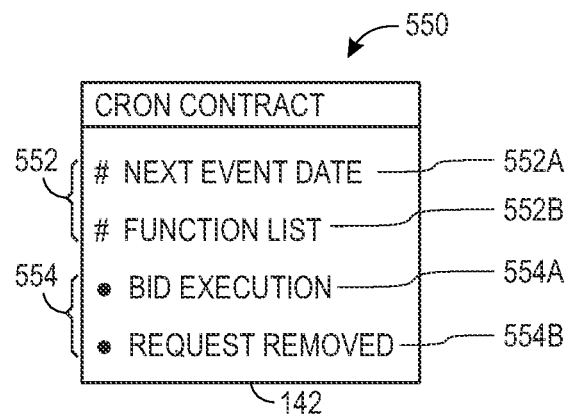
FIG. 10 is a logical diagram of an example of a Cron smart contract, that may be used to perform scheduled execution in other smart contacts, in accordance with an embodiment.

The diagram 550 of FIG. 10 illustrates the data structure of a Cron smart contract 142. The Cron smart contract 142 is a smart contract that may provide incentives to observers of the blockchain to trigger periodic calls to other smart contract in the blockchain. To that end, the Cron smart contract 142 may include a state 552 and member functions 554. In the example, the state 552 may include a target event date 552A, and a list of functions 552B to be triggered periodically. The Cron smart contract 142 may also have a bid function 554A and a reward request function 554B. The bid function 554A may have a low execution cost (e.g., low cost in Gas). The reward request function 554B may have a high execution cost (e.g., high cost in Gas), but provides a high execution profit to the observer once the reward is paid. The Cron smart contract 142 may be configured to receive bids using the bid function 554A from parties to trigger the functions in the list of functions 552B. In order to ensure that the functions are not triggered before the target event date 552A, the Cron smart contract 142 may ignore all the calls to bid function 554A that are received prior to the target event date 552A.

Figure 11:
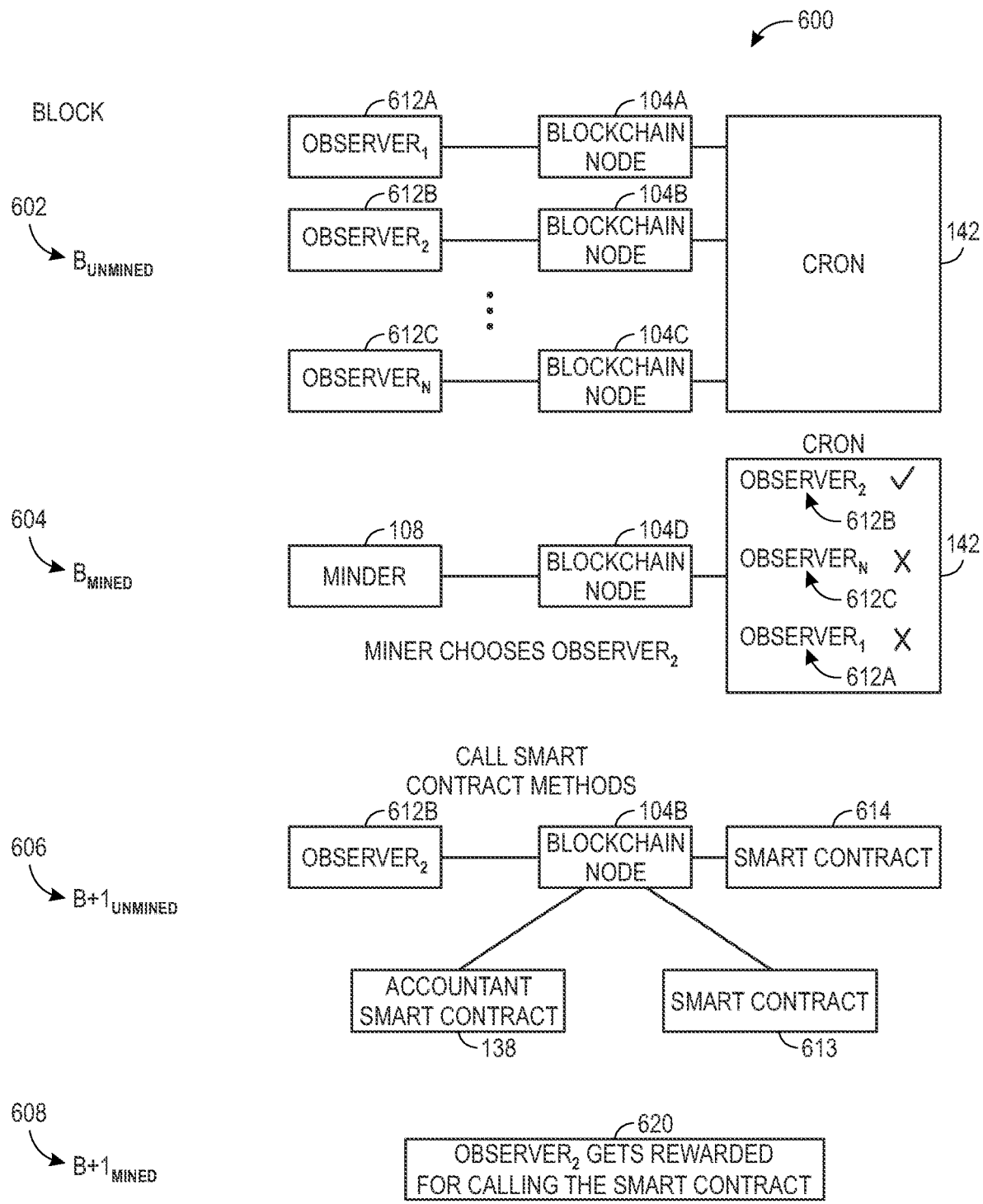
FIG. 11 is a time diagram for a Cron smart contract, such as that of FIG. 10, in accordance with an embodiment.

The operation of the Cron smart contract 142 may be illustrated with reference to diagram 600, of FIG. 11. FIG. 11 illustrates the interactions with the Cron smart contract 142 with respect to states of the blockchain: blockchain state 602, in which a new block B is unmined, a blockchain state 604, in which the block B is mined, blockchain state 606, in which a next block B+1 in unmined and a blockchain state 608, in which the block B+1 is mined, these states show the process of mining block B and block B+1 as needed as subrogation payments are completed and added to the blockchain ledger 124. At the state 602, following the target event date 552A, the Cron smart contract 142 may accept bids from multiple observers, such as observers 612A, 612B, and 612C. The multiple observers such as observers 612A, 612B, and 612C can communicate with the Cron smart contract 142 through multiple blockchain nodes such as blockchain nodes 104A, 104B, 104C, and 104D. The observers 612A, 612B, and 612C illustrate parties that are willing to execute the list of functions 552B of the Cron smart contract 142. To that end, the observers may make a call to the bid function 554A. The bid function 554A may request a small payment from observers 612A, 612B, and 612C for requesting the call, to encourage a large number of bids and decrease latency following the target event date 552A. The bid function 554A is designed to be inexpensive to reduce the Gas cost associated with execution to observers 612A, 612B, and 612C.

After block B is mined, at blockchain state 604, a miner/stalker 108 may select an observer that wins the bid. In the illustrated example, the miner/stalker 108 selects the second observer 612B. The miner/stalker 108 chooses the winning observer because, given the distributed nature of blockchain, only the miner/stalker 108 that mines Block B can say which of the bidding observers 612A, 612B, or 612C was the first to call the bid function 554A, and thus, wins the bid for execution. At the next block B+1 (blockchain state 606) the winning observer, observer 612B may attempt to perform the calls in the list of functions 552B. The list of functions 552B may include functions in diverse smart contracts, such as the illustrated smart contracts 614 and 616. As discussed with respect to FIG. 9, the list of functions may include a call to an Accountant smart contract 138. If the winning observer 612B successfully executes the smart contract, it will receive the associated rewards 620 at the state 608. Rewards may be received by the performance of the list of functions 552B and/or by a call to the reward request function 554B. The reward 620 is designed to be profitable even after the winning observer 612B pays the gas fee for executing the list of functions 552B. Losing observers, such as observers 612A and 612C of the example, do not perform any function, and may receive their deposit (e.g., the cost of execution of the bid function 554A) back via the reward request function 554B. This structure for the Cron smart contract 142 may provide proper incentives observers of the blockchain network and, thus, provides an automated "on-chain" timer. While the Cron smart contract 142 is described herein in the context of the subrogation system blockchain, the Cron smart contract 142 may be modified to provide a timer to any blockchain that allows smart contracts.

Figure 12:
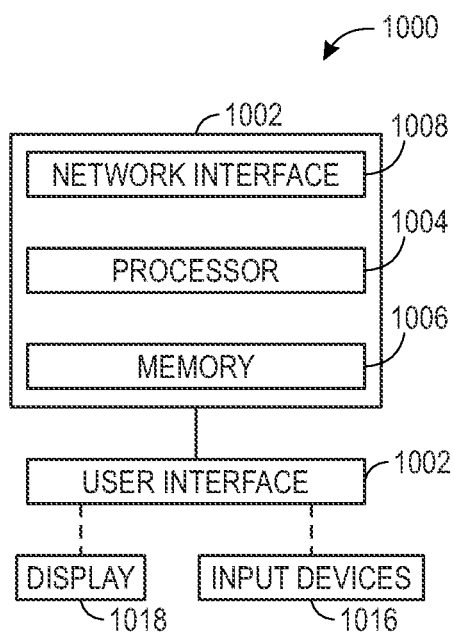
FIG. 12 is an embodiment of an electronic device that may be used to operate and/or interact with the blockchain infrastructure.

FIG. 12 illustrates a computer system 1000 that may be used to implement electronic devices such as blockchain nodes 104A, 104B, 104C, and 104D, and access nodes 112. Computer system 1000 may include a processing unit 1002, that may include a processor 1004, a memory 1006. Processor 1004 may refer to a single application specific integrated circuit (ASIC), to multiple ASICs, or to soft processing circuitry implemented in programmable logic devices, such as FPGAs and PLDs. Processor 1004 may implement universal processing architectures, such as a complex instruction set computer (CISC) architecture or a reduced instruction set computer (RISC) architecture. Processor 1004 may implement specialized processing architectures that may include instructions that include, but are not limited to, operations for blockchain mining.

Memory 1006 may include volatile memory for performance of operations (e.g., random access memory (RAM)) and persistent memory for long-term storage (e.g., hard disks, solid-state devices, etc.). Long-term storage may be optimized for durability and/or access speed times by resorting to configurations such as a redundant array of independent disks (RAID) device. The network interface 1008 may be Ethernet-based connections, including copper wire network connections, backplane connections, and/or a wireless (e.g., WiFi) network connections. Network interface 1008 may also be implemented using other communication standards including, but not limited to, peripheral component interface express (PCIe) connections, Bluetooth connections, Interlaken connections, universal serial bus (USB) connections, and any other method for transmission of information between the blockchain nodes 104 and between the access nodes 112. In access nodes 112, network interface 1008 may also facilitate integration between the subrogation system API 132 and the other computation resources of an organization (e.g., accounting management applications). Access nodes 112 and blockchain nodes 104 may also include user interfaces 1014 of the computer system 1000. The user interfaces 1014 may include input devices 1016 and display devices 1018. Examples of input devices 1016 include keyboards, touchscreen, mouse, touchpads, track point, and other pointing devices. Examples of display devices include computer monitors, console terminals, and printers.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
network circuitry configured to communicate with at least one blockchain node of a blockchain system, wherein the blockchain system comprises a plurality of smart contracts;
processing circuitry;
memory comprising instructions that cause the processing circuitry to:
create a first swap request for an oracle smart contract of the plurality of smart contracts, wherein the first swap request is associated with a first party;
create a signature for the first swap request based on an identifier for the first party; and
create a transaction request to the oracle smart contract comprising the first swap request;
the blockchain system, comprising the oracle smart contract, wherein a data structure of the oracle smart contract is configured to store a plurality of swap components, each of the plurality of swap components having a corresponding signature and identifier; and
wherein the oracle smart contract is configured to:
receive a set of swap requests, wherein each swap request comprises at least a respective swap identifier and a respective signature, and wherein the set of swap requests comprise swap requests from a plurality of parties;
in response to receiving the set of swap requests, store the set of swap requests via the oracle smart contract;
validate, from the oracle smart contract, each received swap request based on the received swap request's respective signature;
identify, from the oracle smart contract, a match of two or more validated swap requests of the set of swap requests based on determining a first swap identifier associated with the first swap request matches a second swap identifier associated with a second swap request, and wherein the first swap request comprises a debtor swap component and the second swap request comprises a creditor swap component; and
in response to identifying the match of two or more validated swap requests, submit a matched swap request to an accountant smart contract uniquely generated for the matched swap request; and
a plurality of accountant smart contracts, each uniquely generated for a corresponding matched swap request to provide a reduced accountant smart contract size and reduced blockchain costs, the plurality of accountant smart contracts comprising the accountant smart contract uniquely generated for the matched swap request, wherein each of the plurality of accountant smart contracts is configured to enter a swap entry on a system blockchain, wherein the swap entry comprises an indication of a netting between the debtor swap component and the creditor swap component.

2. The system of claim 1, wherein the memory comprises instructions to:
  request validation data associated with the first party to a registry smart contract of the plurality of smart contracts; and
  validate the signature based on the validation of each received swap request.

3. The system of claim 1, wherein the memory comprises instructions that cause the processing circuitry to create a third swap request for the oracle smart contract.

4. The system of claim 1, wherein creating each swap request comprises creating an individual corresponding smart contract.

5. The system of claim 1, wherein the accountant smart contract is associated with the first party and a second party, and is configured to:
  receive the matched swap request from the oracle smart contract; and
  settle the matched swap request by adjusting a balance between the first and the second party; and
wherein the memory comprises instructions to request the balance between the first and the second party from the accountant smart contract.

6. The system of claim 5, wherein the memory comprises instruction to create an off-chain payment transaction request to the accountant smart contract.

7. A method, comprising;
  creating a first swap request, via processing circuitry, for an oracle smart contract, wherein the first swap request is associated with a first party;
  creating a signature, via the processing circuitry, for the first swap request based on an identifier for the first party;
  creating a transaction request, via the processing circuitry, to the oracle smart contract comprising an indication of a transaction corresponding to the first swap request;
  receiving a set of swap requests, via the oracle smart contract, wherein each swap request comprises at least a respective swap identifier and a respective signature, and wherein the set of swap requests comprises swap requests from a plurality of parties;
  in response to receiving the set of swap requests, storing, via the processing circuitry, the set of swap requests via the oracle smart contract, wherein a data structure of the oracle smart contract is configured to store a plurality of swap components, each of the plurality of swap components having a corresponding signature and identifier;
  validating, from the oracle smart contract, each received swap request, via the processing circuitry, based on the received swap request's respective signature; and
  identifying, from the oracle smart contract, a match of two or more validated swap requests of the set of swap requests, via the processing circuitry, based on determining a first swap identifier associated with the first swap request matches a second swap identifier associated with a second swap request, and wherein the first swap request comprises a debtor swap component and the second swap request comprises a creditor swap component; and
  in response to identifying the match of two or more validated swap requests, submitting, via the processing circuitry, a matched swap request to a corresponding accountant smart contract of a plurality of accountant smart contracts, wherein each of the plurality of accountant smart contracts is uniquely generated for a corresponding matched swap request to provided a reduced accountant smart contract size and reduce blockchain transaction costs and each of the plurality of accountant smart contracts is configured to enter a swap entry on a system blockchain, wherein the swap entry comprises an indication of a netting between the debtor swap component and the creditor swap component.

8. The method of claim 7, comprising, requesting and settling the matched swap request comprises a single blockchain transaction request.

9. The method of claim 7, wherein the swap requests comprise swap requests from a plurality of parties.

10. The method of claim 7, wherein the oracle smart contract comprises an event identifier, and wherein the oracle smart contract is created using an initial swap request comprising the event identifier.

11. The method of claim 7, comprising receiving results of the transaction, via the processing circuitry.

12. The method of claim 11, where the results of the transaction comprise an output of a member function, acknowledgement of execution of payment, or both.

13. The method of claim 7, wherein validating each received swap request comprises verifying, based on the signature of the first swap request, that the first party is an issuer of the first swap request.

14. The method of claim 7, wherein the signature is provided via one or more encryption methods.

* * * * *